United States Patent [19]

Anastassakis et al.

[11] Patent Number: 5,060,698

[45] Date of Patent: Oct. 29, 1991

[54] LARGE-CALIBER PIPE FOR THERMOPLASTIC MATERIAL

[75] Inventors: Costas Anastassakis; John Charaktinos, both of Moschaton Piraeus, Greece

[73] Assignee: George Aristovoulos Petzetakis, Moschaton Piraeus, Greece

[21] Appl. No.: 583,376

[22] Filed: Sep. 14, 1990

[30] Foreign Application Priority Data

Sep. 22, 1989 [DE] Fed. Rep. of Germany ....... 3931613

[51] Int. Cl.[5] .............................................. F16L 9/16
[52] U.S. Cl. .................................... 138/154; 138/115; 138/150; 138/174
[58] Field of Search ............... 138/154, 150, 172, 174, 138/115, 111, 129, 137

[56] References Cited

U.S. PATENT DOCUMENTS

| | | | |
|---|---|---|---|
| 3,013,584 | 12/1961 | Reed et al. ........................... | 138/137 |
| 3,495,628 | 2/1970 | Boender .............................. | 138/154 |
| 3,679,531 | 7/1972 | Wienand et al. ..................... | 138/154 |
| 3,811,478 | 5/1974 | Ahlqvist .............................. | 138/129 |
| 3,926,223 | 12/1975 | Petzetakis ........................... | 138/129 |
| 3,941,157 | 3/1976 | Barnett ................................ | 138/115 |
| 4,215,727 | 8/1980 | Wijlen ................................ | 138/115 |
| 4,531,551 | 7/1985 | Eichelberger et al. ............. | 138/129 |
| 4,627,472 | 12/1986 | Goettler et al. ..................... | 138/174 |
| 4,759,389 | 7/1988 | Suck .................................... | 138/154 |

FOREIGN PATENT DOCUMENTS

| | | |
|---|---|---|
| 669613 | 12/1965 | Belgium . |
| 2308487 | 8/1976 | Fed. Rep. of Germany . |
| 1178685 | 1/1970 | United Kingdom . |

*Primary Examiner*—James E. Bryant, III
*Attorney, Agent, or Firm*—Herbert Dubno

[57] ABSTRACT

A large-caliber pipe consisting of thermoplastic, constructed from an extruded hollow plastic profile having helical turns welded along a helical contact seam. The hollow plastic profile is a multi-cell profile having a rectangular overall cross section and a rectangular cross section of the cells. The plastic has an integrated reinforcement consisting of embedded fibers in a quantity of 5 to 30% by weight, preferably about 10% by weight, based on the total weight. At least a proportion of the fibers is oriented in the direction of the turns. The orientation of the fibers results in an anisotropic modulus of elasticity and hence an increased annular rigidity and stability.

10 Claims, 2 Drawing Sheets

LARGE-CALIBER PIPE FOR THERMOPLASTIC MATERIAL

Field of the Invention

Our present invention relates to a large-caliber pipe consisting of thermoplastic synthetic resin (i.e. a thermoplastic), constructed from an extruded hollow plastic profile or shape having helical turns welded along a helical contact seam. In terms of welding technology the contact seam is a butt-welded seam. The most diverse plastics can be used for large-caliber pipes of the construction described. However, the plastic used is preferably a polyolefin such as polyethylene or polypropylene. The term "caliber" denotes the diameter.

BACKGROUND OF THE INVENTION

Large-caliber pipes of the construction described are used mainly for underground laying, namely for sewage and waste water purposes. When laid underground they are subject to quasi-hydrostatic stresses from the earth pressure and such stresses have to be taken up by an adequate annular rigidity. In subsidence areas there may additionally be considerable bending stresses which have to be taken up by elastic deformation and which require a high stability of the complete pipe, there otherwise being the risk of rupture due to stability failure.

The pipes described in German Patent 23 08 417 are constructed from a hollow plastic profile of square or rectangular external cross-section and round internal cross-section. The arrangement is such that the hollow plastic profile side walls welded to form a butt-welded seam are about 50% thinner than the free hollow profile walls, and the free hollow profile walls are so designed that the deformation stresses arising from the stressing acting on the underground pipe do not exceed the strength of the butt-welded seams. These known pipes have proved to be satisfactory. They can undergo sufficient elastic deformation and takeup the stresses without any risk of rupture due to stability failure. However, to ensure this, the hollow profile walls must be made appropriately thick. This results in a relatively considerable weight of the known pipes for a given caliber and given stress parameters.

OBJECTS OF THE INVENTION

It is an object of the invention to provide a large-caliber pipe of the basic construction described and distinguished by a reduced weight for a given caliber and the same stress parameters; in other words the improved can be subjected to much higher loading and/or allow a larger caliber for the same weight.

Another object is to provide an improved large-diameter pipe having a high structural strength to weight ratio and free from drawbacks of earlier systems.

SUMMARY OF THE INVENTION

These objects and others which will become apparent hereinafter are attained in accordance with the invention which provides that:

a) the hollow plastic profile or strand is a multi-cell profile (having at least three cells) having a rectangular overall cross-section and a rectangular cross-section of the cells, b) the plastic has an integrated reinforcement consisting of embedded fibers in a quantity of 5 to 30% by weight, preferably about 10% by weight, based on the total weight of the hollow profile or pipe, c) at least a proportion (preferably at least 50%) of the fibers are oriented in the direction of the turns.

The orientation of the fibers results in an anisotropic modulus of elasticity and hence an increased annular rigidity and stability.

Pipes constructed from a multi-cell profile of thermoplastic material are known from Belgian Patent 669 613. In these pipes, the hollow plastic profile does not have a strictly rectangular overall cross section, but has integrally formed weld flanges and corresponding recesses to receive these flanges in the helical coils of the hollow plastic profile. Adequate annular rigidity and stability, even when subjected to bending stress, can be achieved only by a considerable thickness of the walls of the overall cross section and of the cell-forming walls. Singularities occur in the area of the flanges.

In contradistinction thereto, the invention is based on the discovery that an integrated reinforcement of the hollow plastic profile by means of fibers greatly increases the annular rigidity and stability of the pipe without having an adverse effect on the bending characteristics of the pipe if the fibers of the integrated reinforcement are adequately oriented in the direction of the turns. There is no adverse effect on the bending characteristics if the fiber proportion is selected to be within the range stated.

The degree of orientation and also the proportion of oriented fibers in the total integrated fiber mass can be adjusted during the extrusion of the hollow plastic profile. The thinner the rectangle walls and the thinner the cell-forming walls—something which requires appropriate configuration of the extrusion tools—the greater the proportion of fibers oriented in the direction of the turns and the greater the degree of orientation.

Of course, the viscosity of the thermoplasticized material must be so selected during extrusion as to avoid an excessive viscosity having an adverse effect on the orientation. It is an easy matter to determine experimentally a optimal effect whereby the pipe has an optimal bending rigidity and stability for a given caliber and reduced weight. Of course the values that can be achieved also depend on the plastics used and the mix thereof.

The invention also covers the mixing of finely divided mineral fillers additionally into the plastic material. The quality improvement achieved according to the invention without any increase in weight gives the large-caliber pipe according to the invention high strength even when internal pressures have to be taken up. Pipes according to the invention can therefore also be used for carrying media under pressure.

According to the invention for improved ease of manufacturing and to achieve considerable weight reduction is, the cross section of the hollow plastic profile has a rectangle length equivalent to 1 to 5 times the rectangle width of the hollow plastic profile. The thickness of the rectangle walls and of the cell-forming walls governs the proportion of fibers oriented in the direction of the turns.

According to the invention the fibers may basically have any desired length. In one proven embodiment of the invention, the fibers have a length equivalent at most to half the thickness of the rectangle walls or of the cell-forming walls. The orientation can be adjusted and controlled particularly effectively in that case. Generally, at least a proportion of 10% by weight of the fibers, based on the total quantity of fibers, is oriented in the direction of the turns. The fibers may consist of one of the materials "glass, carbon, high-strength plastics (e.g. Aramid), metal, more particularly steel" or a mixture of fibers of each of these substances may be used. The reinforcement of a plastic by such mixed-in fibers is known per se.

For the purpose of improving the compression strength of similar large-caliber pipes it is known (GB patent 11 78 685) to wrap them with a filament reinforcement. This step makes no contribution to improving the annular rigidity and the stability at the indicated stresses. According to the invention, the special effects indicated are achieved by the combination and the orientation in a large-caliber pipe of the construction described.

The invention also includes embodying an additional reinforcement, wherein the hollow plastic profile forms a helical reinforcement in the region of the contact seam, the rigidity and stability of said reinforcement being governed by the thickness of the rectangle walls of the rectangular hollow plastic profile cross section, which are welded at the contact seam.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
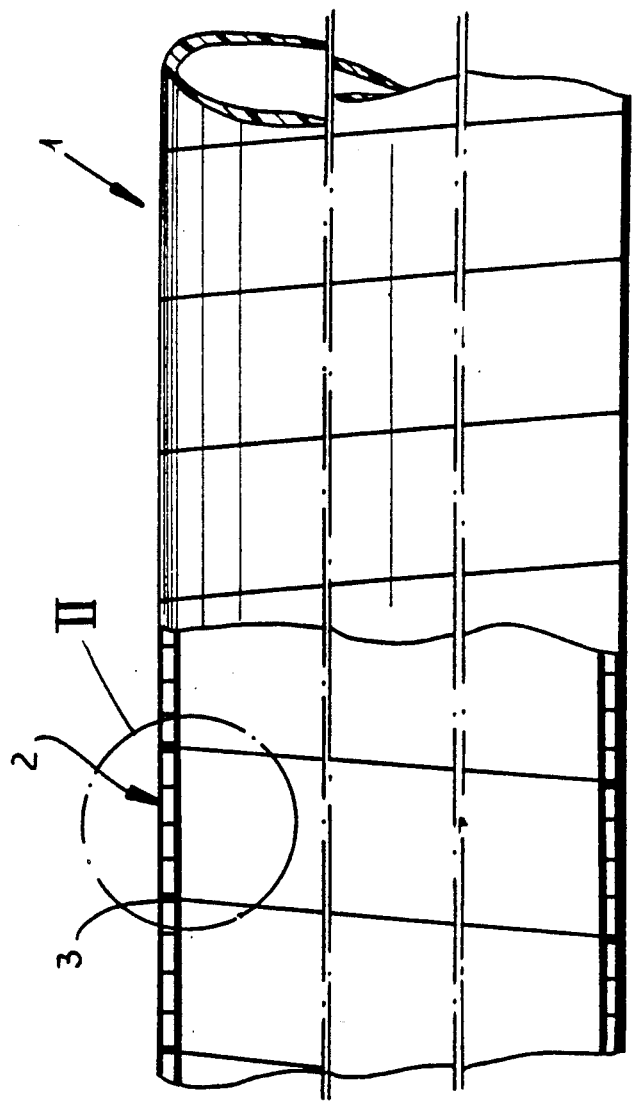
FIG. 1 is a diagrammatic side elevation of a large-caliber pipe according to the invention, partially in longitudinal section.

The large-caliber pipe 1 shown in the drawing consists of a thermoplastic, e.g. polyethylene or polypropylene. Of course the diameter may be much larger than shown in the drawing. The pipe 1 is constructed from an extruded hollow plastic profile 2 with helical turns. These turns are welded along a helical contact seam, namely the butt-welded seam 3.

Figure 2:
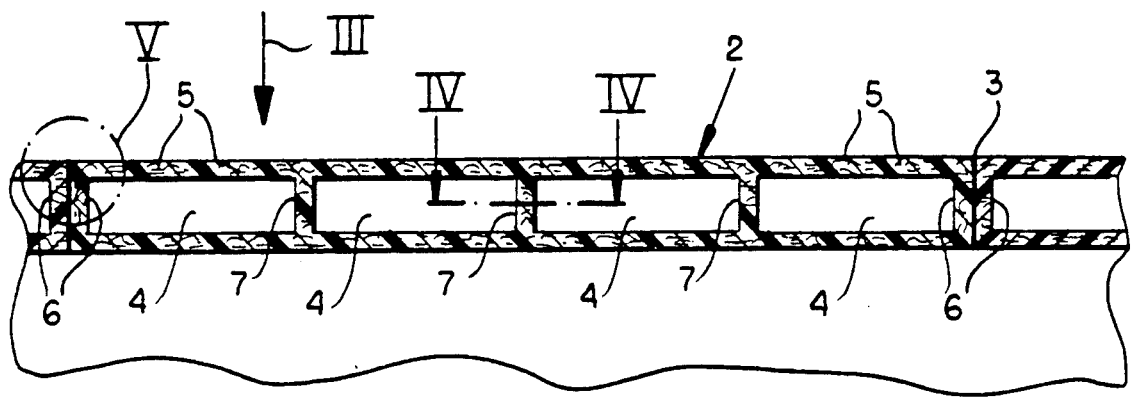
FIG. 2 is the detail II of the article shown in FIG. 1, on a much larger scale.

A comparison of FIGS. 1 and 2 will show that the hollow plastic profile 2 is in the form of a multi-cell profile having a rectangular overall cross section and rectangular cell cross sections. Four cells 4 are shown in the exemplified embodiment.

The plastic from which the hollow plastic profile 2 is constituted has an integrated reinforcement of embedded fibers 5 in a quantity of 5 to 30% by weight, preferably about 10% by weight, based on the total weight of the large-caliber pipe 1.

Figure 3:
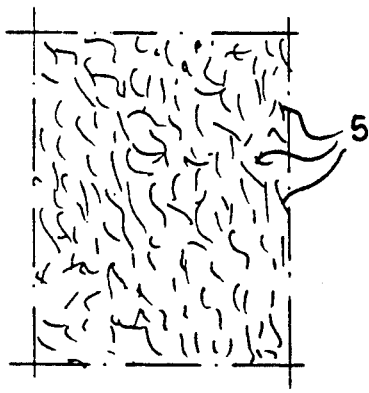
FIG. 3 is a plan view of the article shown in FIG. 2 in the direction of the arrow III on a still larger scale.
Figure 4:
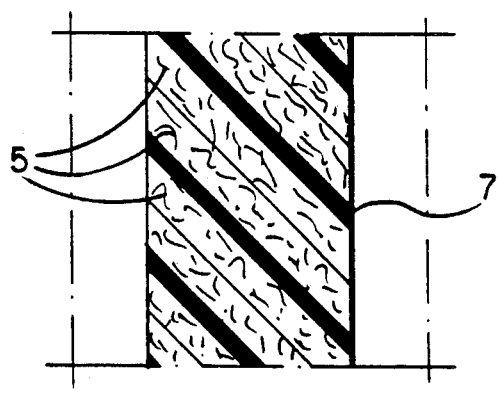
FIG. 4 is a section, on the same scale as FIG. 3, in the direction IV—IV through part of the article shown in FIG. 2.

FIG. 2 shows such fibers in section. It will be seen from FIGS. 3 and 4 that fibers 5 are orientated in the direction of the turns. The arrangement is such that the orientation of the fibers 5 results in an anisotropic modulus of elasticity and, as a result, increased annular rigidity and stability. This permits the weight reduction as described with otherwise identical parameters.

FIG. 2 shows that in the exemplified embodiment the cross section of the hollow plastic profile 2 has a rectangle length equivalent to about four times the rectangle width of the cross section of the hollow plastic profile 2, but it could also be much larger. The thickness of the rectangle walls 6 and of the cell-forming walls 7 governs the proportion of fibers 5 oriented in the direction of the turns. An orientation effect is utilized for this purpose during extrusion in appropriate tools and the viscosity of the plastic is adjusted accordingly. The thinner the walls 6 and 7, the more marked the orientation. The fibers 5 may have a length which is equivalent at most to half the thickness of the rectangle walls 6 and of the cell-forming walls 7.

Generally, at least a proportion of 10% by weight of the fibers 5 should be oriented in the direction of the turns. The fibers 5 may consist of glass, carbon, high-strength plastics, metal, and particularly steel. Alternatively, a mixture of fibers 5 of each of these substances may be used. If a hollow plastic profile 2 is used as shown in FIG. 2, then the pipe 1 has, as it were, twice the wall thickness in the region of the contact seam in respect of the cell-forming walls 7. In this way a helical reinforcement is formed, whose rigidity and stability is determined by the thickness of the rectangle walls 6 welded at the contact seam. However, these outer rectangle walls 6 could also be reduced to half the thickness.

Figure 5:
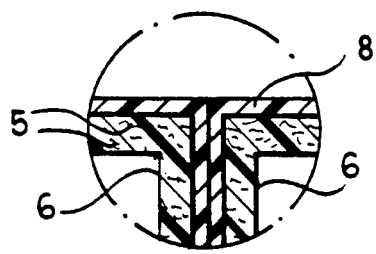
FIG. 5 is a detail view of the region V of FIG. 2.

The enlarged detail V shown in FIG. 5 indicates that the hollow plastic profile 2 in the exemplified embodiment and according to the preferred embodiment of the invention can have a closed coating 8 which consists of a plastic connected to the hollow plastic profile 2 by material-integration (i.e. by welding). The coating 8 may, for example, consist of polyethylene or polypropylene and also can be a foam material. The coating 8 is preferably applied by co-extrusion. It is intended, for example, to protect the fibers 5 from chemical and mechanical stresses. The pipe I as a whole also experiences corresponding protection. The life or durability of the pipe 1 can be greatly improved in this way. It is also possible to make the hollow plastic profile 2 from relatively cheap, e.g. recycled, material and otherwise adjust the characteristics of the pipe 1 by way of the coating 8.

We claim:

1. A large-caliber pipe comprising helical turns of an extruded hollow profile welded contiguously along a helical contact seam, said extruded hollow profile being composed of a thermoplastic in which fibers are embedded in an amount of 5 to 30% by weight of the hollow profile and having a rectangular configuration and being internally subdivided into a multiplicity of cells of rectangular cross section, at least a portion of said fibers being oriented in a longitudinal direction of the profile and in a direction in which said turns extend so that the orientation of said fibers generated an anisotropic modulus of elasticity of said turns imparting annular rigidity and stability thereto.

2. The large-caliber pipe defined in claim 1 wherein said fibers constitute about 10% by weight of said pipe.

3. The large-caliber pipe defined in claim 1 wherein a cross section of said hollow profile has a rectangle-side length substantially 1 to 5 time its rectangle-side width and thicknesses of walls of said rectangle and said cells determines the proportion of fibers oriented in the direction in which said turns extend.

4. The large-caliber pipe defined in claim 3 wherein said fibers have lengths at most equal to half a thickness of said walls.

5. The large-caliber pipe defined in claim 4 wherein at least 10% of said fibers by weight are oriented in the direction in which said turns extend.

6. The large-caliber pipe defined in claim 5 wherein said fibers are composed of at least one material selected from the group which consists of glass, carbon, high-strength plastic, metal and mixtures thereof.

7. The large-caliber pipe defined in claim 6 wherein at least some of said fibers are composed of steel.

8. The large-caliber pipe defined in claim 6 wherein said profile forms a helical reinforcement along said seam with a rigidity and stability determined by the thicknesses of walls of adjacent turns welded together at the seam.

9. The large-caliber pipe defined in claim 6 wherein said profile has a coating of a plastic bonded thereto and surrounding the hollow profile so that the coating and profile are integrated into one another.

10. The large-caliber pipe defined in claim 9 wherein said coating is a coextrusion with said hollow profile.

* * * * *